United States Patent [19]
Terrell

[11] 3,831,264
[45] Aug. 27, 1974

[54] METHOD OF CONNECTING SUBSTANTIAL SIMILAR METAL PARTS

[75] Inventor: Olney B. Terrell, Richmond, Ind.

[73] Assignee: The United States of America as represented by the Secretary of the Air Force, Washington, D.C.

[22] Filed: Feb. 22, 1973

[21] Appl. No.: 334,793

[52] U.S. Cl............ 29/517, 29/1.11, 86/1, 29/516, 102/2
[51] Int. Cl............................................. B21d 39/00
[58] Field of Search ............ 29/509, 511, 516, 237, 29/517, 1.1, 1.11, 1.3; 285/382, 383, 256, 258; 86/39, 40, 41, 1; 102/2, 4, 7.2

[56] References Cited
UNITED STATES PATENTS

| | | | |
|---|---|---|---|
| 244,446 | 7/1881 | Gilmore | 285/382 |
| 244,804 | 7/1881 | Gillespie | 285/382 |
| 724,349 | 3/1903 | Stanton | 285/382 |
| 1,487,389 | 3/1924 | King | 285/382 |
| 1,775,055 | 9/1930 | Tarbox et al. | 285/382 |
| 2,374,270 | 4/1945 | Brock | 29/511 |
| 2,417,350 | 3/1947 | Conroy | 285/382 |
| 2,498,395 | 2/1950 | Coss | 285/382 |
| 2,574,625 | 11/1951 | Coss | 285/382 |
| 3,603,258 | 9/1971 | Green | 102/4 |
| 3,711,131 | 1/1973 | Evans | 285/256 |

*Primary Examiner*—Charles W. Lanham
*Assistant Examiner*—James R. Duzan
*Attorney, Agent, or Firm*—Harry A. Herbert, Jr.; Arsen Tashjian

[57] ABSTRACT

Two substantially similar metal parts are connected by forming a male configuration at the end of the first metal part forming a complementary female configuration at the end of the second substantially similar metal part; flaring the female configurated end of the first part to accept the male configurated end of the second part; positioning the two parts so that they are disposed female end to male end, and also so that they are axially aligned; inserting the male configurated end of the first part into the female configurated end of the second part, while maintaining axial alignment of the parts, whereby the two configurated ends are releasably engaged; and, squeezing the flared female end, whereby the two configurated ends are mated. As a result, a positive, permanent, and interlocking joint is formed, and the two substantially similar metal parts are permanently and reliably connected inexpensively, simply, and quickly. This method is exceptionally well-suited for use during the manufacture of a spherical bomblet, which comprises two similar metal hemispheres which are filled with explosive, in connecting the respective free and open end of each of the two similar and explosive-filled metal hemispheres, and thereby preventing the pinching, and the subsequent inadvertent and unintended detonating, of the explosive.

2 Claims, 5 Drawing Figures

METHOD OF CONNECTING SUBSTANTIAL SIMILAR METAL PARTS

BACKGROUND OF THE INVENTION

This invention relates to the connecting and joining arts and, more particularly, to a novel method of forming a joint for connecting two substantially similar metal parts.

Although connectors and joint-forming components are well known, it is fair and accurate to state that existing effective embodiments thereof have a large number of component elements, are relatively expensive, may be complex to use, and may also be, and usually are, time consuming to utilize. In some particular adaptations for a specific use, some joint-forming components are not reliable; and, in fact, they may be dangerous. For example, in the manufacture of bomblets, the joint used to assemble the metal components of the housing (or casing) of the pressed explosive may, and has, "pinched" the pressed explosive contained within the housing, with undesired and disastrous results.

I have invented a novel method of forming a joint for connecting two substantially similar metal parts, which said inventive method results in a joint which has a minimum of components or elements, which is very inexpensive, and which is simple to use, and which can be formed quickly.

In addition, my method can be adapted, for use in the manufacture of bomblets, for forming the joint for assembling the bomblet housing or casing, without danger of "pinching" the pressed explosive internal of the joined metal housing components.

In summary, I have, therefore, significantly advanced the state-of-the-art.

SUMMARY OF THE INVENTION

This invention pertains to the connecting of two substantially similar metal parts to each other, permanently and reliably.

The principal object of this invention is to provide a novel method which will permit the aforesaid type of connection.

Another object of this invention is to provide such a novel method by which the connection can be made with a minimum of components, inexpensively, simply, and quickly.

These objects, and other equally important and related objects, of this invention will become readily apparent after a consideration of the description of my inventive method and reference to the drawings.

DESCRIPTION OF THE INVENTIVE METHOD

1. The Generic Method

My basic inventive method of permanently and reliably connecting together two substantially similar metal parts, includes (in the generic, broad, and most simple approach) six fundamental steps which, in appropriate particular circumstances, may be varied in number and/or in sequence and still achieve the same desired end result.

Figure 3:
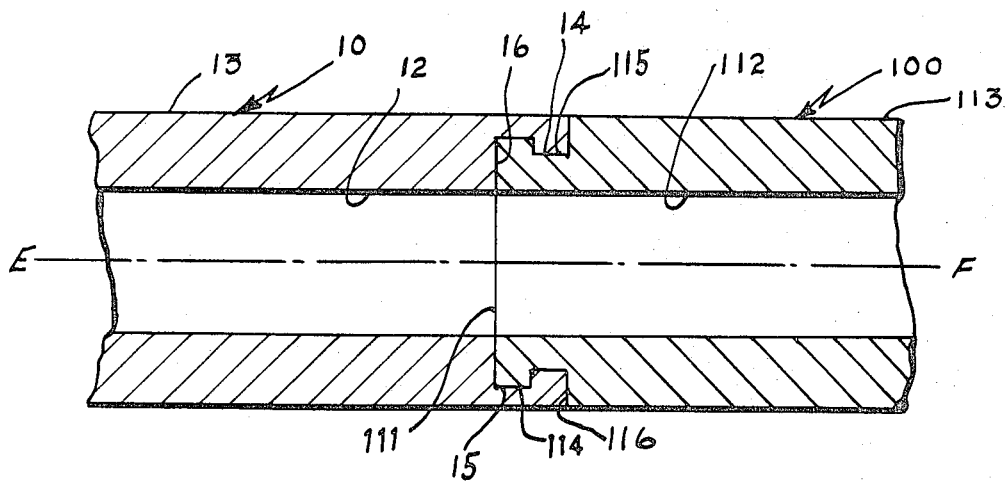
FIG. 3 is also a side elevation view, in simplified schematic form, in cross section and partially fragmented, of the two substantially similar metal parts, which are shown in FIGS. 1 and 2, connected permanently and reliably by the use of my basic inventive method.
Figure 4:
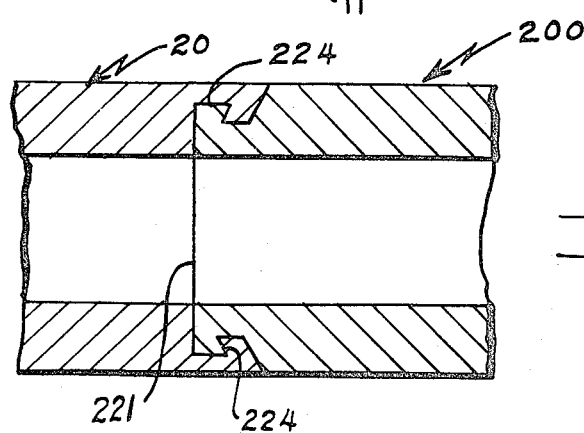
FIG. 4 is also a side elevation view, in simplified schematic form, in cross section and partially fragmented of two other substantially similar metal parts, connected permanently and reliably by the use of a variation of my basic inventive method.
Figure 5:
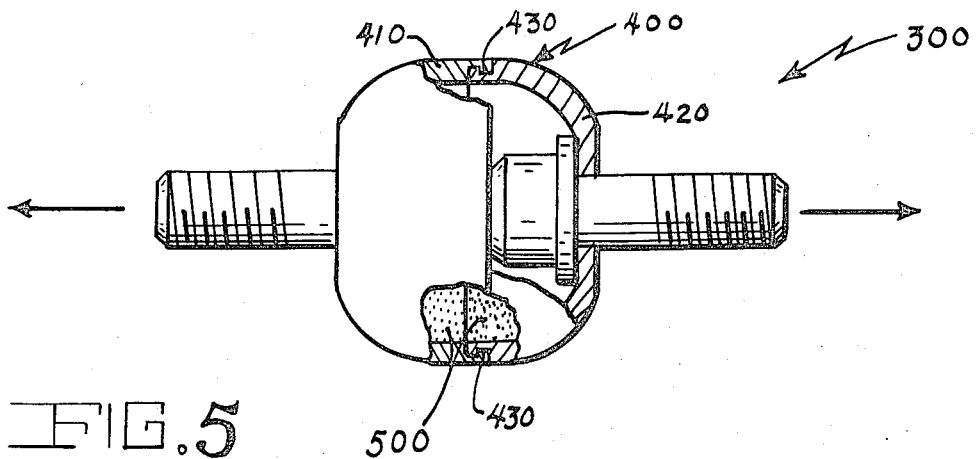
FIG. 5 is a side elevation view, in simplified schematic form, partially in cross section and partially fragmented, of a bomblet which has a metal housing or casing, the substantially similar halves of which are permanently, reliably, and safely connected with and by the use of my basic inventive method, which said housing or casing containing therein a pressed explosive.

The end result of the performance of the fundamental steps of my basic inventive method is shown in FIG. 3, and also in FIG. 4, and also in FIG. 5. These Figures will be discussed later herein.

As a preliminary matter, it is to be noted and to be remembered that the term "part", as used herein is intended to include and be synonymous with, and interchangeable with, the terms "article," "item," "component," "element," "portion," "section," "segment," and the like. Additionally, it is also to be noted and to be remembered that the word "axis," or the like, is intended to mean a (or the) geometric axis of the particular "part," or the like, to which it has reference.

Figure 1:
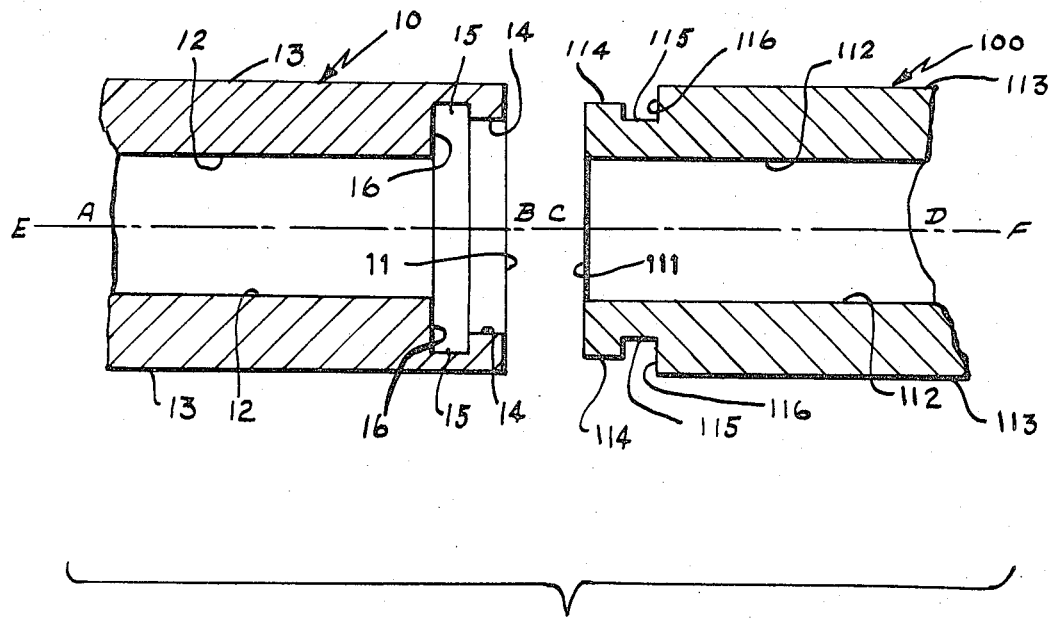
FIG. 1 is a side elevation view, in simplified schematic form, in cross section and partially fragmented, of two substantially similar metal parts which are to be connected, showing the result of the performance of some of the preliminary steps of my basic inventive method.

With reference to FIG. 1, therein are shown two substantially similar metal parts 10 and 100 which are to be permanently and reliably connected to each other. As a matter of simplification and illustration, and not of limitation, second part 10 and first part 100 are identical cylinders, although of course they need not be. Second part 10 has a free, i.e. unencumbered, and open end 11; an internal surface 12; an external surface 13; and a longitudinal axis A–B. First part 100 also has a free, i.e., unencumbered, and open end 111; an internal surface 112; an external surface 113; and a longitudinal axis C–D.

The six fundamental steps of my basic inventive method are:

Firstly, I form a male type configuration on the external surface 113 of the free and open end 111 of the first metal part 100. The male configuration includes a flange 114, a groove 115, and a shoulder 116. The male configuration is formed by suitable conventional means, such as machining. The results of this step are shown in FIG. 1.

Next, I form a complementary, i.e., mating, female type configuration on the internal surface 12 of the free and open end 11 of the second metal part 10. The female complementary configuration includes a flange 14, a groove 15, and a shoulder 16. The female configuration is also formed by suitable conventional means, such as machining. The results of this step are shown in FIG. 1.

Figure 2:
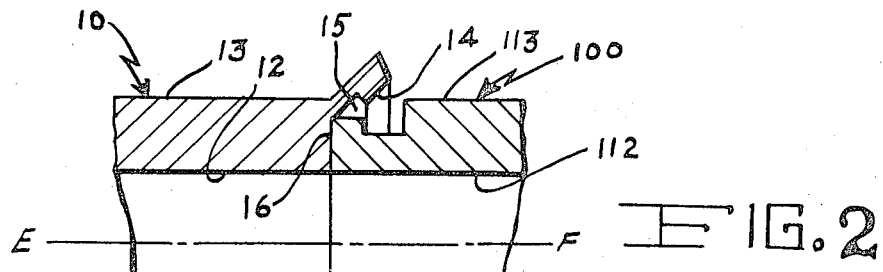
FIG. 2 is also a side elevation view, in simplified schematic form, in cross section and partially fragmented, of the two substantially similar metal parts, which are shown in FIG. 1, showing the result of the performance of some of the intermediate steps of my basic inventive method.

Then, I flare, i.e., open and/or spread outwardly, or the like, the female configurated free and open end 11 of second metal part 10 to accept the complementary male configurated free and open end 11 of first metal part 100. The flaring is performed by suitable conventional means, such as by the use of a die. The results of this step are shown in FIG. 2, wherein the same reference numerals denote the same parts, and portions thereof, already shown in FIG. 1.

Next, I position the second metal part 10 and the first metal part 100 adjacent to each other, so that they are disposed free end-to-free end, i.e., free end 11 of second metal part 10 faces free end 111 of first metal part 100, and are also axially aligned, i.e., so that longitudinal axis A–B of second metal part 10 and longitudinal axis C–D of first metal part 100 coincide and form common longitudinal axis E–F. The results of this step are shown in FIG. 2, wherein the same reference numerals denote the same parts, and portions thereof, already shown in FIG. 1.

Then, I insert the male configurated free and open end 111 of first metal part 100 into the female configurated free and open end 11 of the second metal part 10, while maintaining axial alignment of the second and first metal parts 10 and 100. As a result, the free ends 11 and 111 of the metal parts 10 and 100 are releasably engaged. The results of this step are shown in FIG. 2.

Lastly, I squeeze, i.e., compress, or the like, the flared female configurated end 11 of the second metal part 10 by suitable conventional means, such as by pushing (or by pulling, in an appropriate situation), which said flared female end 11 is releasably engaged with and to the male configurated end 111 of first metal part 100, through a die ring. As a result, the female end 11 of part 10 and the male end 111 of part 100 mate, forming a positive, permanent, and interlocking joint. Thereby, second metal part 10 and first metal part 100 are permanently and reliably connected, as shown in FIG. 3, wherein the same reference numerals denote the same parts, and portions thereof, already shown in FIGS. 1 and 2.

2. Variation of The Generic Method

Now, because of my teaching, it will occur to others of ordinary skill in the connecting art that my basic or generic method can be varied, and that the same desired results will be achieved, nevertheless.

For example, and with reference to FIG. 4, substantially similar metal parts 20 and 200, which are (but need not be) identical cylinders for illustrative purposes, are shown in FIG. 4 connected permanently and reliably by the use of such a variation of my basic or generic inventive method. That variation, as can be seen by comparing FIGS. 1 and 3 with FIG. 4, comprises in essence the additional step of undercutting the flange 224 of the male configurated end 221 of metal part 200. The undercut flange 224 may, in a particular situation, be preferred. The undercutting may be made by machining, and the undercutting step per se may be performed whenever appropriate, but preferably as after the step of forming the male configuration of part 200.

3. Specific Application of The Basic Method

As may be surmised from the hereinabove, my basic inventive method (or a variation thereof) can be used advantageously in many devices and the like to provide a positive, permanent, interlocking joint by and between two substantially similar metal parts. For example, it can be used in and for the assembly of hemispherical, spherical, and cylindrical bomblets and other ammunition components, such as warhead bodies, fuze containers, motor bodies, and ogives.

With regard to the foregoing about the utilization of my basic invention, or a variation thereof, for the assembly of bomblets and the like, reference is made to FIG. 5. Therein is shown the result of the specific applications of the performance of the steps of my basic method to a adaptation. More specifically, therein is shown a bomblet 300 which has a metal housing or casing 400, the substantially similar halves of which 410 and 420 are permanently, reliably, and safely connected by the use of my method, with the joint formed being generally designated by reference numeral 430, and with the pressed explosive contained within the joined or connected metal halves 410 and 420 being designated by reference numeral 500.

The use of my invention method in this particular adaptation is, in itself, a significant advance in the state-of-the-art, since it absolutely precludes the "pinching", and the subsequent explosion, of the pressed explosive 500, a long sought goal in the art.

CONCLUSION

From all of the foregoing, it is readily apparent that the objects of my inventive method have been attained.

Additionally, while there have been shown and described the unique and fundamental steps of my basic inventive method, as set forth not only in the basic method taught herein, but also as set forth in the variation thereof and in the particular adaption thereof disclosed hereinabove, it is to be understood that other variations and other adaptations of my basic inventive method can be made by those of ordinary skill in the art, without departing from the spirit of my invention. For example, my basic inventive method can be used, or can be adapted to be used, to fabricate gas cylinders, tubing, and similar articles.

I claim:

1. In the manufacture of a bomblet of generally spherical shape, wherein said bomblet has a casing comprising a first metal hemisphere and a second metal hemisphere which are substantially similar, the method permanently and reliably connecting said first metal hemisphere and a second substantially similar metal hemisphere, wherein each said hemisphere has a free and open end, an internal surface, an external surface, and an axis, and wherein said connecting is to be free end-to-free end, comprising the steps of:
    a. forming a male type configuration on the external surface of the free and open end of said first metal hemisphere, wherein said male configuration includes a flange, a groove, and a shoulder;
    b. forming a complementary female type configuration on the internal surface of the free and open end of said second substantially similar metal hemisphere, wherein said female complementary configuration includes a flange, a groove, and a shoulder;
    c. flaring said female configurated and open end of said second metal hemisphere to accept the male configurated free and open end of said first metal hemisphere;

d. positioning said first metal hemisphere and said second substantially similar metal hemisphere so that said metal hemispheres are disposed free end-to-free end, and also so that said metal hemispheres are axially aligned;
e. filling said first and said second metal hemispheres with a suitable explosive;
f. inserting the male configured free and open end of said first metal hemisphere into the flared female configured free and open end of said second metal hemisphere, while maintaining axial alignment of said metal hemispheres, whereby said free ends of said metal hemispheres are releasably engaged;
g. and, squeezing the flared female configured end of said second metal hemisphere, whereby said female configured end of said second metal hemisphere and the male configured end of said first metal hemisphere are mated;
whereby a positive, permanent, and interlocking joint is formed without pinching the explosive within said first and said second metal hemispheres, and whereby said first metal hemisphere and said second metal hemisphere are connected permanentaly and reliably and without the danger of said explosive detonating.

2. The method, as set forth in claim 1, which includes the additional step of undercutting the male configurated end of the first metal hemisphere, after forming the male configuration on said first metal hemisphere.

* * * * *